July 31, 1962 G. A. MARSH ETAL 3,047,478
MITIGATING CORROSION OF MARINE STRUCTURES
Filed Nov. 25, 1959

INVENTORS.
GLENN A. MARSH
EDWARD SCHASCHL
BY
*Edward H. Lung*
ATTORNEY 3,047,478
MITIGATING CORROSION OF MARINE
STRUCTURES
Glenn A. Marsh and Edward Schaschl, Crystal Lake, Ill.,
assignors to The Pure Oil Company, Chicago, Ill., a
corporation of Ohio
Filed Nov. 25, 1959, Ser. No. 855,385
10 Claims. (Cl. 204—148)

This invention is directed to a method for eliminating or substantially reducing the corrosion of vertical steel marine structures. More particularly this invention is directed to a method and device for mitigating the corrosion of steel structures which extend in a substantially vertical direction from the ocean floor to above the surface of the water.

It is a known practice in the Gulf of Mexico and in other salt water bodies to use steel structures, such as piling, drilling platforms, etc., the upper portions of which are ensheathed in a corrosion-resistant metal. The corrosion-resistant metal is applied from a point above the splash zone, that is the highest zone to which wave crests and spray ordinarily reach, to a point substantially below mean low tide. The protective metal sheath may be composed of Monel metal, brass, tin, copper, lead, or other corrosion-resistant metals and alloys. Monel metal has been found highly satisfactory for this purpose and is preferred. By thus ensheathing the upper portion of a vertical marine structure, effective protection is obtained in the highly corrosive region at and near the water line.

There are two mechanisms by which corrosion proceeds on a vertical structure in sea water. First, there is local cell action in which the corrosion rate is roughly proportional to the availability of dissolved oxygen at the surface of the steel. In the absence of sufficient oxygen, the local cathodic areas become polarized and the galvanic corrosion process is slowed or stopped altogether. It is to combat this local cell action in the highly aerated water at the ocean surface that the Monel sheath is employed. Secondly, there is long-cell action in which the portion of the vertical structure in the aerated upper zone of water acts as a cathode, and the lower portion of the structure in the deaerated lower ocean zone acts as an anode. The oxygen concentration in the deaerated zone, which lies downward from a point about 20 feet below the water surface, is so low that little or no local cell corrosion occurs at the surface of the structure in this zone. This low oxygen concentration, together with the high oxygen concentrations near the surface of the water, produces a concentration cell and renders the lower portion of the structure anodic to the upper portion so that there is substantial long-cell corrosion of the lower portion of the structure. The application of a Monel sheath near the water surface does not solve this problem; in fact, it makes it worse. In sea water, Monel is cathodic with respect to steel, and this effect, together with that of the oxygen concentration difference, produces a long-cell action which rapidly corrodes the steel below the lower extremity of the Monel sheath.

In many locations the mineral content of the sea water is not high, but still is sufficient to provide a high enough conductivity to permit long-cell action. Such locations are found in harbors and estuaries. A classic example is the almost-enclosed bay, Lake Maracaibo, in northwestern Venezuela. In such waters the cathodic Monel sheath does not tend to be covered with calcareous deposits, and its action as a cathode is not thus impeded. In such instances, the Monel sheath does protect against local cell action at the ensheathed zone, but long-cell action proceeds unhampered. Furthermore, since the concentration of the dissolved solids is less than in sea water, the electrical conductivity is also less. This means that instead of being spread out over a large area, the long-cell action acts principally at a region close to the lower terminus of the Monel sheath. The steel structure is rapidly eaten through at this point and fails.

It is an object of this invention to provide a method for preventing or substantially reducing long-cell corrosion occurring below the ensheathed portion of a vertical, corrodible, marine structure. It is another object of this invention to provide a method for fabricating marine structures, such as piles, to render them substantially impervious to the effects of salt-water corrosion. Yet another object of this invention is to provide a marine pile structure which is substantially impervious to corrosion in salt water.

This invention is best described with reference to the drawings, of which:

Figures 1, 2:
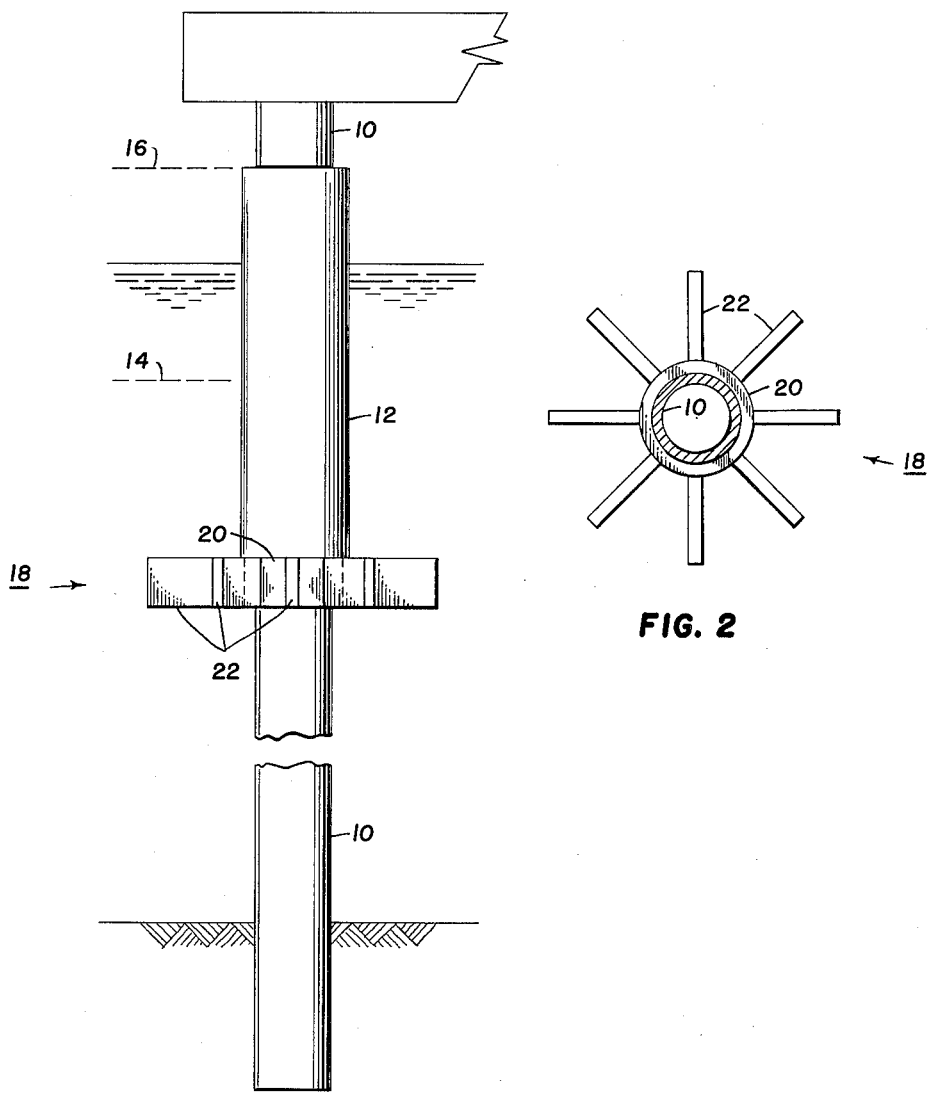
FIGURE 1 is a front elevational view of a pile protected in accordance with the method of this invention.
FIGURE 2 is a plan view of the pile depicted in FIGURE 1.

Pile 10 is enclosed in an essentially non-corrodible metal sheath 12, from below the mean low tide line 14 to a point 16 above the top of the splash zone. Preferably, the lower end of the sheath extends about 20 feet below mean low tide. The sheath is fabricated of Monel and is water tight, and may preferably be of welded construction. Adjacent to the lower edge of the sheath is a disc-shaped sacrificial member 18 whose outer radius is at least about one foot greater than that of the pile. Since this member is sacrificial, its thickness may be made any desirable value to incorporate sufficient metal. The disc may be fabricated in segments so that it may be replaced when substantially consumed. Both the Monel metal sheath and the steel pile are coated, the steel pile being coated with an effective corrosion-inhibiting material such as a coal-tar epoxy resin. The sacrificial member is left bare. The coating on the Monel sheath should be electrically insulating to reduce the action of the sheath as a cathode. When imperfections appear in the coating, the Monel will function as a cathode, but it will protect the steel over which it is laid from local cell action. The lower part of the pipeline is coated, and is prevented from being anodic. When breaks do occur in the coating, these areas will compete with disc 18 as anodic areas. Since disc 18 is located closer to the Monel cathode 12, it will be more anodic relative to cathode 12 than the steel at the points at which the corrosion-inhibiting coating has failed. The sacrificial member, which is preferably made of steel, will not act to cathodically protect the steel pile which lies below it. Cathodic protection of the steel pile is not essential, since because of the low oxygen concentrations in the water surrounding the steel pile, local cell action is minimal. It is only necessary to eliminate the long-sell action between the steel pile and the Monel metal sheath. The sacrificial member does this because it corrodes in preference to the more remote steel piling, and acts as an anode to form a galvanic couple with the Monel sheath. In this manner the cathodic tendency of the Monel sheath is satisfied, and corrosion of the steel pile is eliminated. The purpose of the coating on the Monel sheath is to reduce the effective cathodic area of the sheath. This has the advantage of requiring the use of a sacrificial member of lesser area to satisfy the cathodic tendencies of the sheath.

The dissolved oxygen content of a natural body of water normally varies from saturation at the water surface to zero in the mud layer at the bottom of the body of water. When the sacrificial member is placed at a depth of 20 feet or more below the water surface, the differences in oxygen concentration below this depth will not be great. Where the Monel sheath extends over a lesser length of the structure, the sacrificial member, being supported at the lower terminus of the metal sheath, will be mounted higher and in water of increased oxygen content. Sacrificial member 18 then can itself act as a cathode relative to bare places at the lower depth. This action is much less pronounced than that of the Monel metal sheath, first of all because the oxygen concentration difference is smaller, and secondly because the sacrificial member is fabricated of a material which is not naturally cathodic to steel. To minimize any cathodic influence of the sacrificial member relative to the lower portions of the steel pile, it is desirable to keep the area of the sacrificial members small. Thus a perforated disc or a spoke-like arrangement is preferred.

FIGURE 2 depicts a sacrificial member in which spoke like elements extend radially outward from the pile. Pile 10 is surrounded by a small-diameter ring 20 from which extends a plurality of spokes 22. The sacrificial members, whatever their design, should be fabricated from a material no lower in the electromotive series than steel. This is because if the sacrificial member were lower than steel in the electromotive series, it would tend naturally to be cathodic to the steel pile. Materials higher in the electromotive series than steel may be used, but the steel itself is preferred because metals higher in the electromotive series are consumed more rapidly and therefore provide less economical protection. In some instances, where the sacrificial member is placed close to the mean low tide line in highly aerated water, it may be desirable to fabricate the sacrificial member of a material such as zinc which is higher in the electromotive series than iron. This will overcome the effects of the oxygen concentration difference in the water near the sacrificial member and the water near the steel pile which lies below the sacrificial member. The higher activity of the zinc can thus counteract the effects of the oxygen concentration difference so that the sacrificial member will be neither anodic or cathodic with respect to the steel pile. A zinc sacrificial member would of course be highly anodic with respect to the Monel sheath and would therefore be effective to prevent the long-cell action; however, the life of a zinc sacrificial member would be short. For reasons of economics, it may be desired not to coat the Monel sheath. To avoid long-cell action in such a case, it is preferred to extend the radius of the disc or spokes a distance of at least about 2 feet greater than the radius of the pile. It is preferred, however, to coat the Monel metal, and thus reduce the rate of consumption of the sacrificial member, as well as the radius of the sacrificial member. The coating need not be as elaborate as that placed on the lower section of the pile, for the purpose is not to prevent corrosion of the Monel sheath, which itself is impervious to corrosion, but merely to electrically insulate the Monel sheath to reduce its cathodic tendencies. While this invention has been described with reference to a single pile, it is evident that the method is applicable to pipe lines and more complex structures.

The embodiments of the invention in which an exclusive property or privilege is claimed are defined as follows:

1. A method of mitigating the corrosion of a corrodible, metallic, marine structure extending in a generally vertical direction from a point above the water surface to a point below mean low tide comprising ensheathing that portion of said structure extending from a point above the splash zone to a point below mean low tide with a corrosion-resistant metal which is cathodic with respect to said structure, and disposing a generally disc-shaped sacrificial member at the lower terminus of said corrosion-resistant sheath and encompassing said structure, said sacrificial member being in electrical contact with said sheath, fabricated of a metal not substantially anodic or cathodic with respect to said structure, and extending radially from said structure a distance of at least about 1 foot.

2. A method according to claim 1 including the step of applying a corrosion-preventing coating to the portion of said structure extending below said member, and applying to said corrosion resistant metallic sheath an electrically-insulating coating.

3. In combination with a corrodible metallic marine structure extending in a generally vertical direction from a point above the water surface to a point more than about 20 feet below mean low tide, a corrosion-resistant metallic sheath which is cathodic with respect to said structure enclosing that portion of said structure extending from the top of the splash zone to below mean low tide, and a generally disc-shaped sacrificial member, fabricated of a metal not substantially anodic or cathodic with respect to said structure, encompassing said structure and supported therefrom at the lower terminus of said sheath, said sacrificial member being electrically connected to said sheath, and extending radially from said structure a distance of about 1 to 2 feet.

4. A combination according to claim 3 in which the corrosion-resistant sheath extends to a point about 20 feet below mean low tide.

5. A combination according to claim 4 in which said structure is of steel and the corrosion-resistant sheath is composed of Monel metal.

6. A combination according to claim 5 in which the sacrificial member is composed of steel.

7. A combination according to claim 6 including a corrosion-preventing coating covering the portion of said structure which extends below said sacrificial member.

8. A combination according to claim 7 including an electrically-insulating coating covering said Monel metal sheath.

9. A combination according to claim 4 in which said sacrificial member is a perforated disc extending radially from said structure a distance of about 2 feet.

10. A combination according to claim 4 in which said sacrificial member comprises a plurality of radially-extending spokes supported from said structure in a plane substantially perpendicular thereto, and said spokes have a length of about 2 feet.

References Cited in the file of this patent

FOREIGN PATENTS

| 7,145 of 1897 | Great Britain | Mar. 19, 1897 |
| 11,216 | Great Britain | May 14, 1906 |
| 683,629 | Great Britain | Dec. 3, 1952 |

OTHER REFERENCES

Mansford: "Corrosion Technology," October 1956, pp. 314–16.